(12) United States Patent
Hallyn (10) Patent No.: US 8,195,748 B2
(45) Date of Patent: Jun. 5, 2012

(54) GEOGRAPHICAL EMAIL PRESENTATION (75) Inventor: Serge E. Hallyn, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1048 days.

(21) Appl. No.: 11/621,367

(22) Filed: Jan. 9, 2007

(65) Prior Publication Data
US 2008/0168347 A1 Jul. 10, 2008

(51) Int. Cl.
G06F 15/16 (2006.01)
G06F 3/00 (2006.01)
(52) U.S. Cl. ......................................... 709/206; 715/752
(58) Field of Classification Search .................. 709/206; 715/752
See application file for complete search history.

(56) References Cited

U.S. PATENT DOCUMENTS

| | | | |
|---|---|---|---|
| 5,944,787 A | 8/1999 | Zoken | 709/206 |
| 5,990,886 A * | 11/1999 | Serdy et al. | 715/752 |
| 6,480,885 B1 | 11/2002 | Olivier | 709/207 |
| 6,577,714 B1 | 6/2003 | Darcie et al. | 379/93.17 |
| 6,654,800 B1 | 11/2003 | Rieger, III | 709/223 |
| 2004/0054732 A1 | 3/2004 | Carter et al. | 709/206 |
| 2005/0055627 A1* | 3/2005 | Lloyd et al. | 715/505 |
| 2006/0112086 A1 | 5/2006 | Douress et al. | 707/3 |
| 2008/0046511 A1* | 2/2008 | Skrenta | 709/204 |
| 2008/0163118 A1* | 7/2008 | Wolf | 715/835 |

* cited by examiner

Primary Examiner — Jerry Dennison
(74) Attorney, Agent, or Firm — Hamilton & Terrile, LLP; Stephen A. Terrile (57) ABSTRACT An email content management method, system and program are provided for mapping a plurality of received electronic mail (email) messages to a plurality of predetermined graphical representations of an email Inbox. Predetermined sender and originating information is associated with an email. When the email is received by the recipient, the associated sender and originating information is used to map the email to a graphical Inbox depicting the email's originating location. Once mapped, the corresponding email graphical Inbox is represented in a graphical display, such as the user interface of an email client. Graphical Inboxes can be represented as subsets of a geographical map or depict an organizational hierarchy chart. Status information related to the received email messages is generated and display attributes are applied to their corresponding email graphical Inboxes.

21 Claims, 9 Drawing Sheets

GEOGRAPHICAL EMAIL PRESENTATION

BACKGROUND OF THE INVENTION

1. Field of the Invention

The present invention relates to computer software, and more particularly graphically depicting an originating location of received electronic mail (email) messages.

2. Description of the Related Art

Electronic mail (email) has evolved into a fast, reliable, and easy-to-use method of communication for correspondents who are geographically dispersed. While highly effective, the growing popularity of email has led to rapid growth in the number of active email accounts. Each of these accounts has one or more unique email addresses, which correlate to the physical location of the account holder as well as their originating mail server. It is also common for other information, such as physical mailing addresses, to be associated with these accounts. As a result, numerous email address books, directories and databases have been developed and implemented to facilitate identity management of both senders and recipients.

However, as the volume of email grows it is becoming more challenging for recipients to quickly remember or identify the originating location of the email sender. For example, it is not uncommon for an email recipient to receive messages from two senders that have the same first and last name (e.g., Bob C. Smith, Bob W. Smith, etc.) but reside in different physical locations. Even more common is for email senders to have different last names, but share the same first name (e.g., Bob Smith, Bob Jones, etc.). Further confusion is created when simplistic or common aliases (e.g., "Bob In Boston") have been used by the sender in a misguided belief they are facilitating recognition of either their identity or physical address. In some cases, incoming messages are simply filed in a generalized email Inbox with no consideration of the sender's originating location, requiring the recipient to recognize each sender and determine their identity or physical address. In other cases, no information is available other than the network address of the sender's originating email server. As a result, important messages are inevitably mistaken as being from someone else, overlooked, mistakenly filed, or deleted.

Prior approaches for email identity management have included displaying associated information (e.g., mailing address, phone number, etc.) through user gestures such as the recipient right-clicking on the sender's email address in their email client interface. This approach can help reduce ambiguity and confusion if two or more senders have the same or similar names but different physical locations. However, the email recipient has to be diligent in verifying the physical location of each sender, which can be tedious, error-prone and time consuming. Furthermore, the ability to determine the sender's originating location or address is limited if their phone number is the only associated information available. Other approaches have included the implementation of junk email filtering techniques, but these simply reduce the number of misdirected emails. Still other approaches assign a priority to the incoming email, either through the application of an icon, color coding, or by filing the email in a predetermined mailbox. Other prior approaches for email identity management include the implementation of maps to facilitate the sending of email messages. For example, an image of a geographical map that graphically indicates a plurality of persons or entities can be presented in a user interface. Alternatively, the map might comprise an organization chart showing individuals' relative locations in the organizational chart. In addition, the map can be implemented such that it illustrates one or more relationships between different individuals or entities. By selecting points or areas on the map image displayed in the user interface, the sender can designate individual recipients or create distribution lists. However, no similar approach exists for allowing recipients to have their received email messages graphically displayed on a map or other representation, either by geography or other determining factor.

SUMMARY

An email content management method, system and program are provided for mapping a plurality of received electronic mail (email) messages to a plurality of predetermined graphical representations of an email Inbox. In selected embodiments, predetermined sender and originating information is associated with an email. In one embodiment, the sender and originating information comprises an information repository such as an email directory or database accessible by an email graphical Inbox mapper. In another embodiment, the sender and originating information is appended to the email.

When the email is received by the recipient, the associated sender and originating information is used to map the email to a graphical Inbox depicting the email's originating location. In one embodiment, the originating location of the email is determined by using the sender's physical address. In another embodiment, the originating email server address is correlated to a physical location. Once mapped, the corresponding email graphical Inbox is represented in a graphical display, such as the user interface of an email client. In one embodiment, the user interface of an email client is used for mapping received emails to predetermined graphical Inboxes represented as subsets of a geographical map. In another embodiment, the user interface of an email client is used for mapping received emails to predetermined graphical Inboxes depicting an organizational hierarchy chart.

Status information related to the received email messages is generated and display attributes are applied to their corresponding email graphical Inboxes. In one embodiment, a graphical Inbox representing a subset of a geographical map is shaded in a predetermined color to indicate the status of the email messages it contains. In another embodiment, a graphical Inbox representing an organizational subset of a hierarchical organization chart is outlined in a predetermined color to similarly indicate the status of the messages it contains. In yet another embodiment, status details of received emails are viewable through user gestures such as a mouse double-click or hover over the graphical Inbox representation that contains them. The above, as well as additional purposes, features, and advantages of the present invention will become apparent in the following detailed written description.

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

An email content management method, system and program are disclosed for mapping a plurality of received electronic mail (email) messages to a plurality of predetermined graphical representations of an email Inbox. Predetermined sender and originating information is associated with an email. When the email is received by the recipient, the associated sender and originating information is used to map the email to a graphical Inbox depicting the email's originating location. Once mapped, the corresponding email graphical Inbox is represented in a graphical display, such as the user interface of an email client. For example, graphical Inboxes can be represented as subsets of a geographical map or depict an organizational hierarchy chart. Status information related to the received email messages is generated and display attributes are applied to their corresponding email graphical Inboxes.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
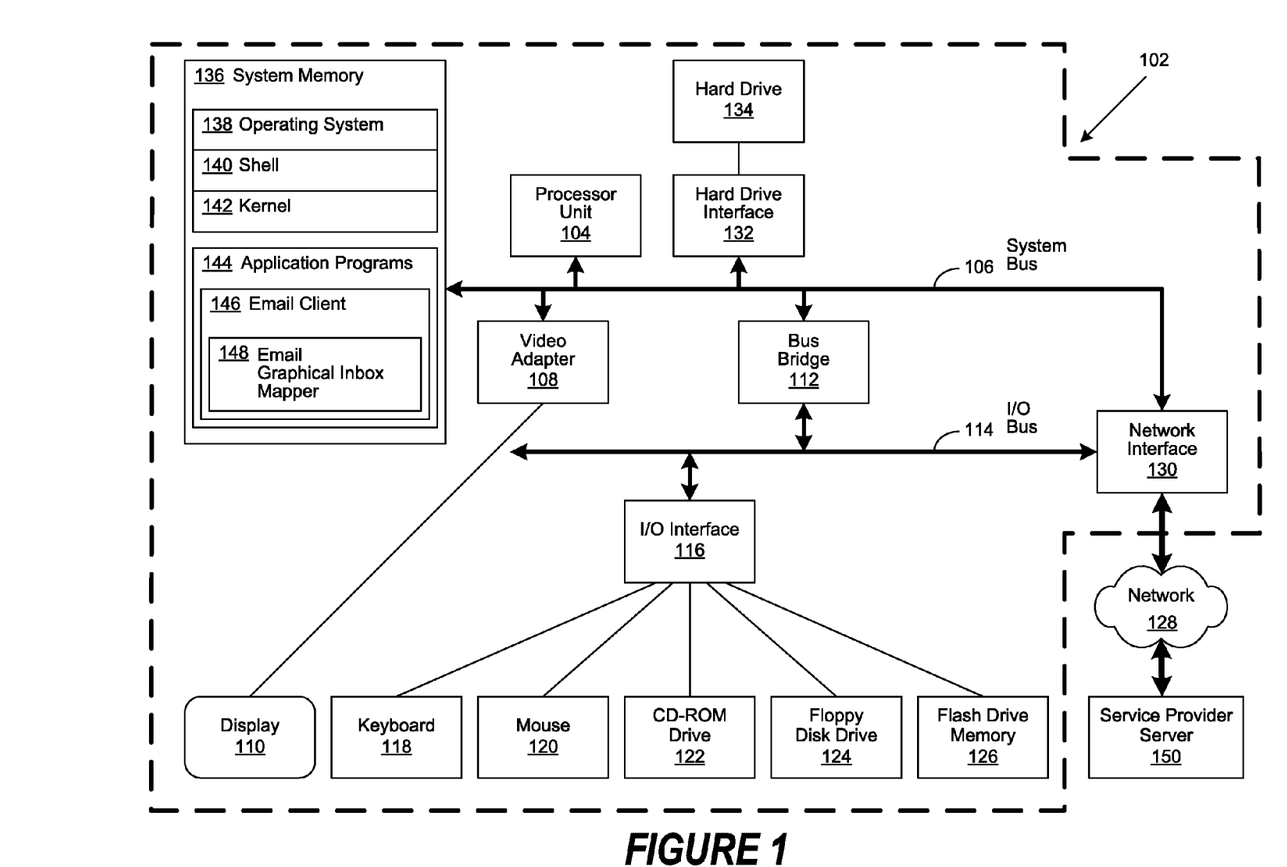
FIG. 1 depicts an exemplary client computer in which the present invention may be implemented.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 150 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 150.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes client computer 102's operating system (OS) 138 and application programs 144.

OS 138 includes a shell 140 for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and application programs 144, including memory management, process and task management, disk management, and mouse and keyboard management.

Application programs 144 may include an email client 146. Email client 146 includes program modules and instructions enabling email messages to be sent and received. Email client 146 also includes an email graphical Inbox mapper 148. Email graphical Inbox mapper 148 includes code for implementing the processes described in FIGS. 2-8 described hereinbelow. In one embodiment, client computer 102 is able to download email recipient mapper 148 from a service provider server 150.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
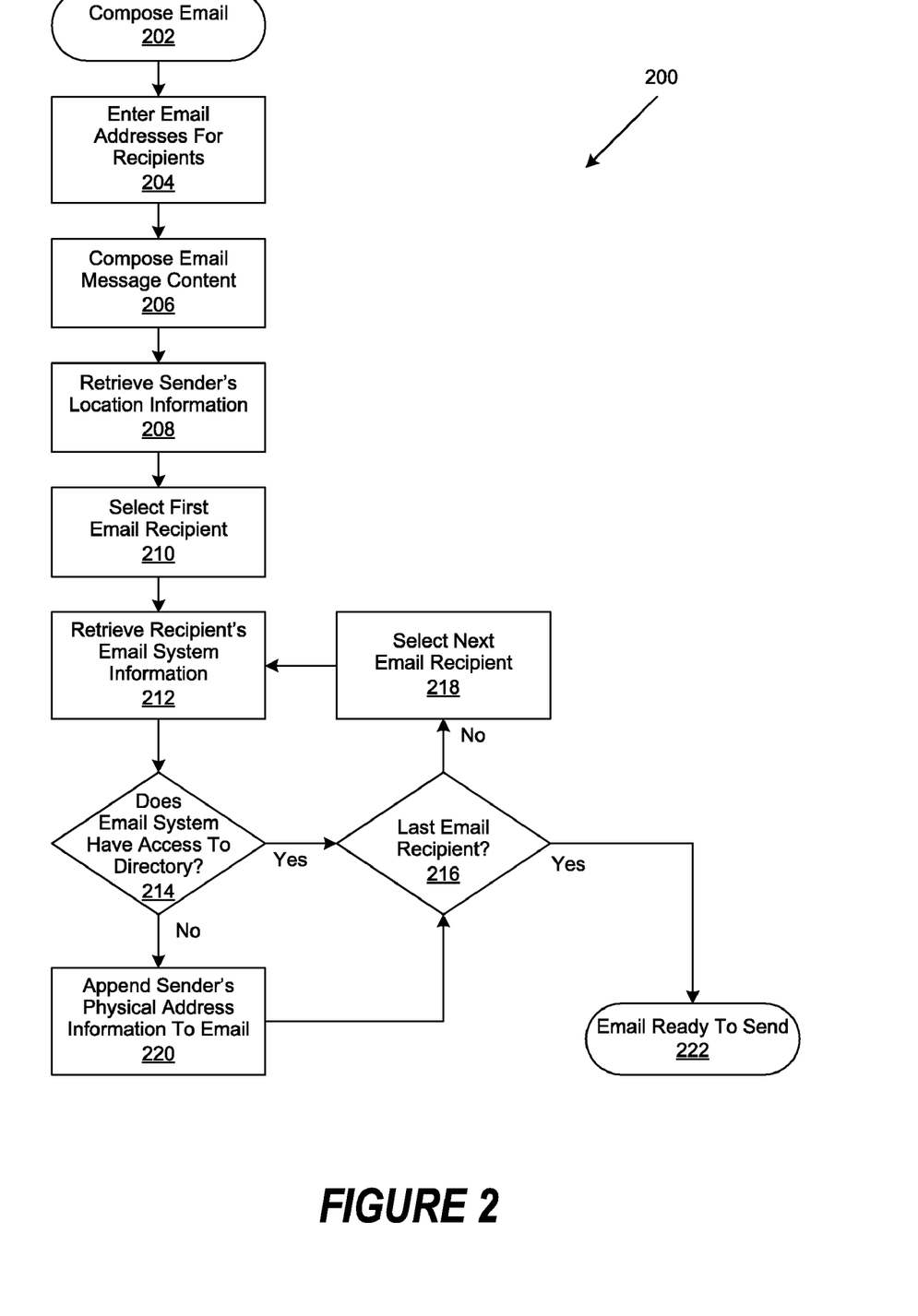
FIG. 2 shows a flow chart for associating sender and originating location information with unsent electronic mail (email) message content.

FIG. 2 shows a flow chart for associating sender and originating location information with unsent electronic mail (email) message content 200. In selected embodiments of the invention, an email sender begins composition of an email in step 202. Email addresses of recipients are entered into the email client in step 204, email message content is composed in step 206 and the sender's location information is retrieved in step 208. This information can include the sender's physical address, a landline phone number, the address of their originating email server, their position in an organization hierarchy, or a pointer to one or more email directories or other databases containing this information.

The first recipient of the composed email is chosen from the previously entered email recipients in step 210. Once chosen, information about the recipient's email system is retrieved in step 212 to determine whether it has access to an email directory or other database containing the sender's location information. If it is determined in step 214 that the email recipient's email system has such access, and if it is determined in step 216 that the first recipient is the only recipient, then the email is ready to send in step 222. Otherwise, the sender's location information is appended to the email in step 220. If it is determined in step 216 that the first recipient is the only recipient, then the email is ready to send in step 222. Otherwise, the next email recipient is selected in step 218 from the previously entered list of recipients and the process is repeated beginning with step 212.

Figure 3:
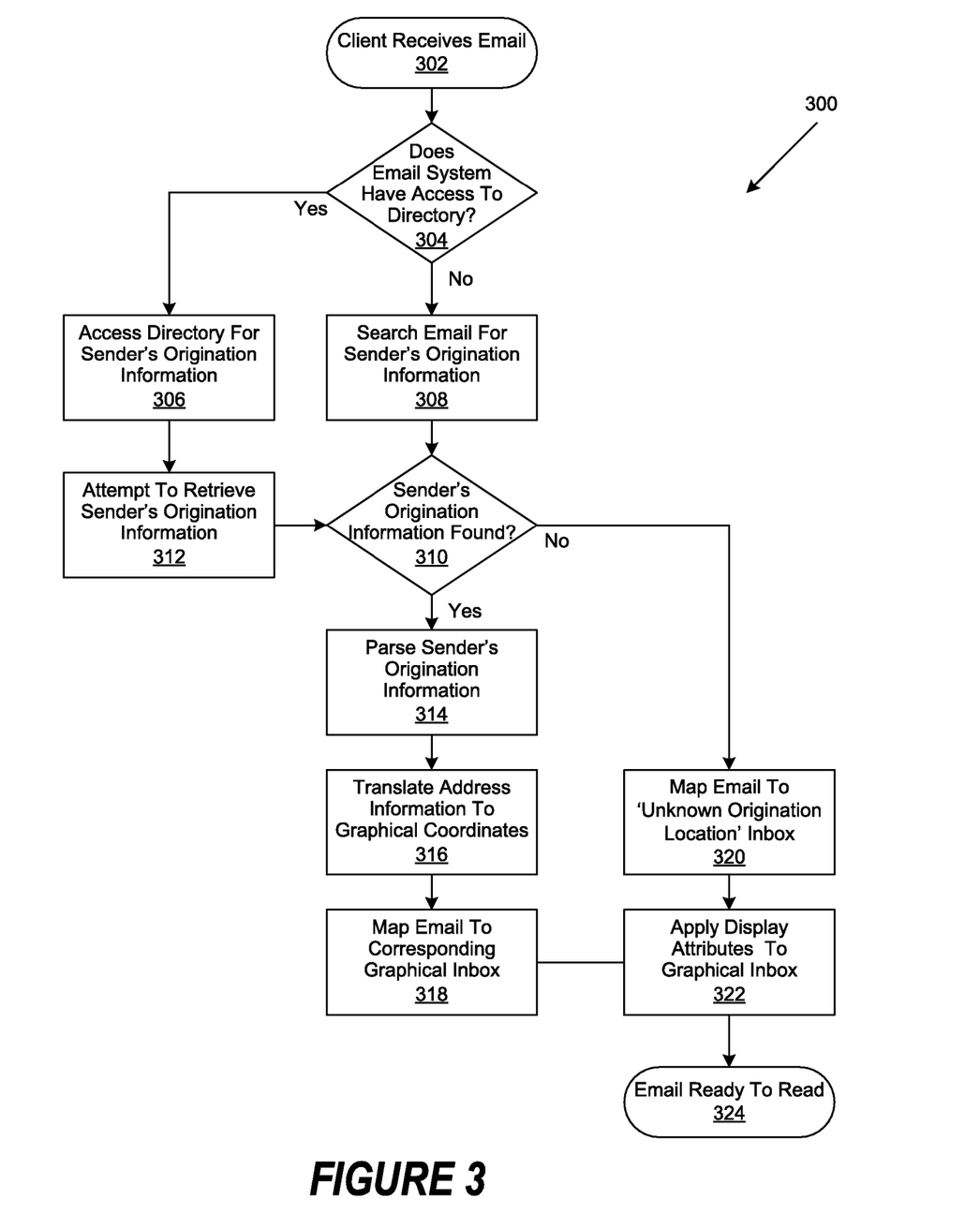
FIG. 3 shows a flow chart for using associated sender and origination location information to map a received email to a predetermined graphical depiction of an email Inbox.

FIG. 3 shows a flow chart for using associated sender and origination location information to map a received email to a predetermined graphical depiction 300 of an email Inbox. In selected embodiments of the invention, an email recipient logs into an email client to receive email beginning in step 302. If it is determined in step 304 that the recipient's email system has access to an email directory or database containing the metainformation associated with the sender's email address, then the directory or database is accessed in step 306. The recipient's email client then attempts to retrieve predetermined metainformation comprising the email sender's origination information.

If it is determined in step 310 that the required origination information cannot be retrieved, then the email is mapped to a graphical Inbox associated with unknown origination locations in step 318. Predetermined display attributes are then applied to the graphical Inbox in step 322 and the email is ready to read in step 324. For example, in one embodiment, a display attribute of <Red, Bold> applied to the graphical Inbox label indicates that it contains the greatest number of urgent email messages after the most recently received email message is mapped to it. In another embodiment, a display attribute of <Yellow, Highlight> applied to the outline of the graphical inbox indicates that it contains the most recent email messages after the most recently received email message is mapped to it. In yet another embodiment, a display attribute of <Blue, Shading> applied to the graphical Inbox indicates that it contains the most unread email messages after the most recently received email is mapped to it. In one embodiment, the recipient's email client can be configured to override the display attributes with attributes of the recipient's choosing. It will be appreciated that many such display attribute variations are possible.

If it is determined in step 304 that the recipient's email system does not have access to an email directory or database containing the metainformation associated with the sender's email address, then the email is searched for the sender's origination information in step 310. If it is determined in step 310 that the required origination information cannot be retrieved, then the email is mapped to a graphical Inbox associated with unknown origination locations in step 320.

Predetermined display attributes are then applied to the graphical Inbox as described in greater detail herein in step 322 and the email is ready to read in step 324. Otherwise, the retrieved origination information is parsed in step 314 and translated in step 316 to graphical coordinates within the user interface of the recipient's email client correlating to predetermined graphical Inboxes. The email is then mapped to the corresponding graphical Inbox in step 318, predetermined display attributes are applied to the graphical Inbox as described in greater detail herein in step 322, and the email is ready to read in step 324.

Figure 4:
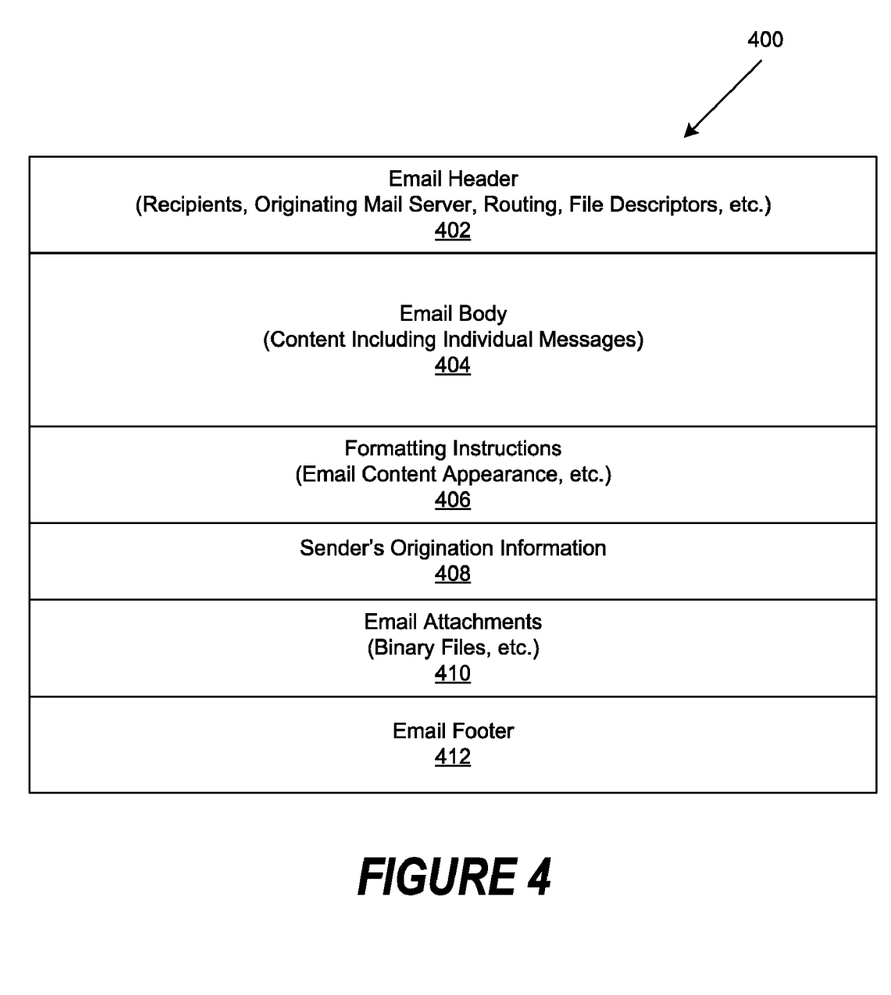
FIG. 4 shows a received email sender and origination information as implemented in an email file format.

FIG. 4 shows a received email sender and origination information as implemented in an email file format 400. In selected embodiments of the invention, email file format comprises email header 402, email body 404, formatting instructions 406, sender's origination information 408, email attachments 410, and email footer 412. The email header 402 typically comprises the email addresses of the email recipients, the sender's originating mail server, network routing information, file descriptors and other related information required to deliver and process the email for use by the recipient. The email body 404 typically comprises text, with embedded binary files such as pictures and charts attached as binary file attachments 410. The formatting instructions 406 typically comprise instructions processed by an email client for the presentation of message content comprising email body 404 and binary file attachments 410. Sender's origination information 408 comprises metainformation such as the sender's physical address, a landline phone number, the address of their originating email server, their position in an organization hierarchy, or a pointer to one or more email directories or other databases containing this information.

Figure 5:
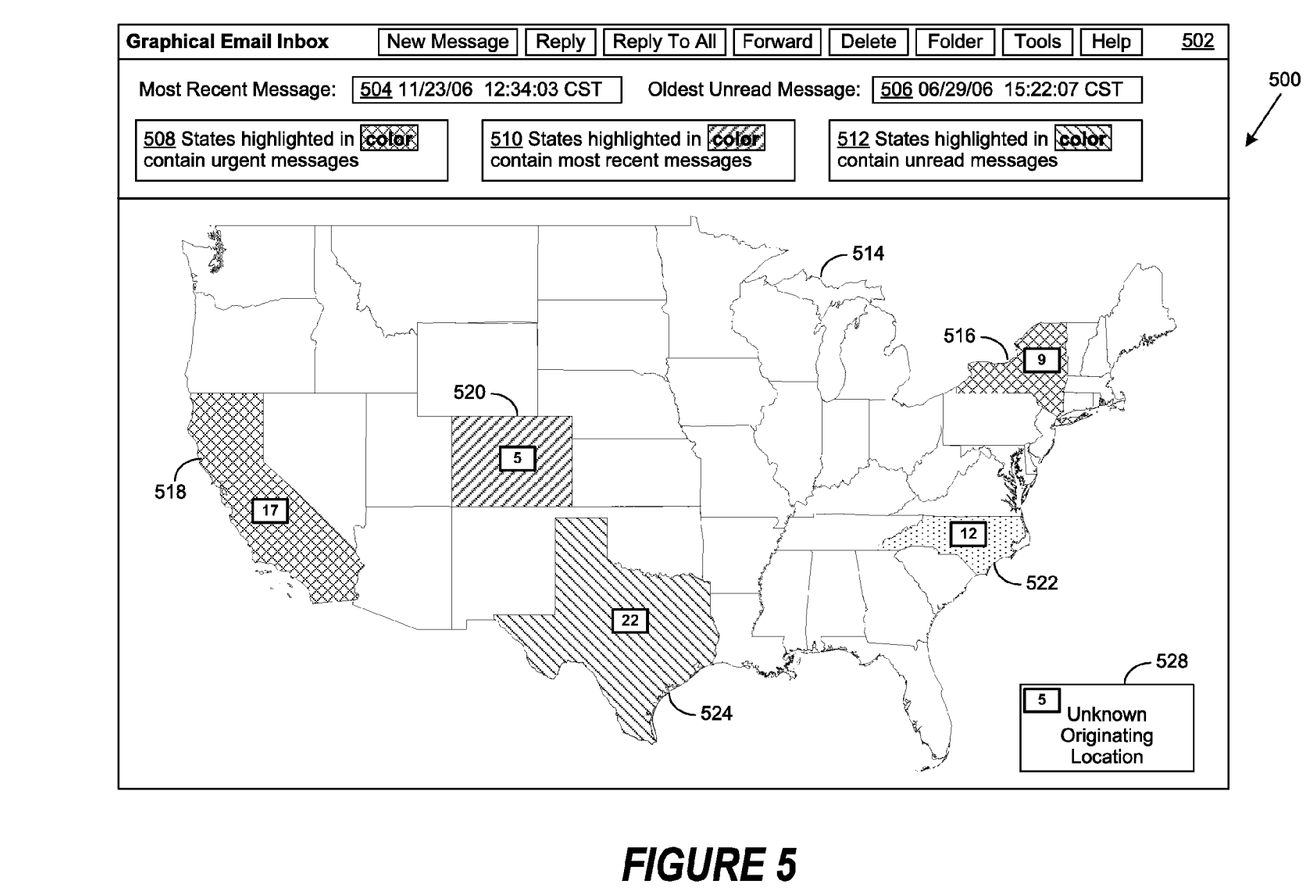
FIG. 5 shows the user interface of an email client as used for mapping received emails to predetermined graphical Inboxes represented as subsets of a geographical map.

FIG. 5 shows the user interface of an email client 500 as used for mapping received emails to predetermined graphical Inboxes represented as subsets of a geographical map. The user interface of email client 500 comprises command bar 502, time and date stamp of the most recently received email message 504, and time and date stamp the oldest unread email message 506. The user interface of email client 500 further comprises alert messages and color legends for graphical Inboxes containing urgent messages 508, most recent messages 510, and unread messages 512. The user interface of email client 500 also comprises a graphical representation of a map of the United States 514, which comprises graphical Inboxes represented as individual states, and a graphical Inbox 528 comprising 5 email messages with unknown originating locations.

In one embodiment, the map of the United States 514 comprises graphical Inboxes for New York 516, California 518, Colorado 520, North Carolina 522 and Texas 524. In this embodiment, the graphical Inbox for New York 516 contains 9 messages and exhibits display attributes signifying that it contains urgent email messages as indicated in alert and color legend 508. The graphical Inbox for California 518 similarly contains 17 messages and also exhibits display attributes signifying that it contains urgent email messages as indicated in alert and color legend 508. The graphical Inbox for Colorado 520 contains 5 messages, but exhibits display attributes signifying that it contains the most recently received email messages as indicated in alert and color legend 510. Similarly, the graphical Inbox for Texas 524 contains 22 messages, and exhibits display attributes signifying that it contains the most unread email messages as indicated in alert and color legend 512. In a like manner, the graphical Inbox for North Carolina 522 contains 12 messages, but only exhibits display attributes signifying that it contains email messages originating from North Carolina.

Figure 6:
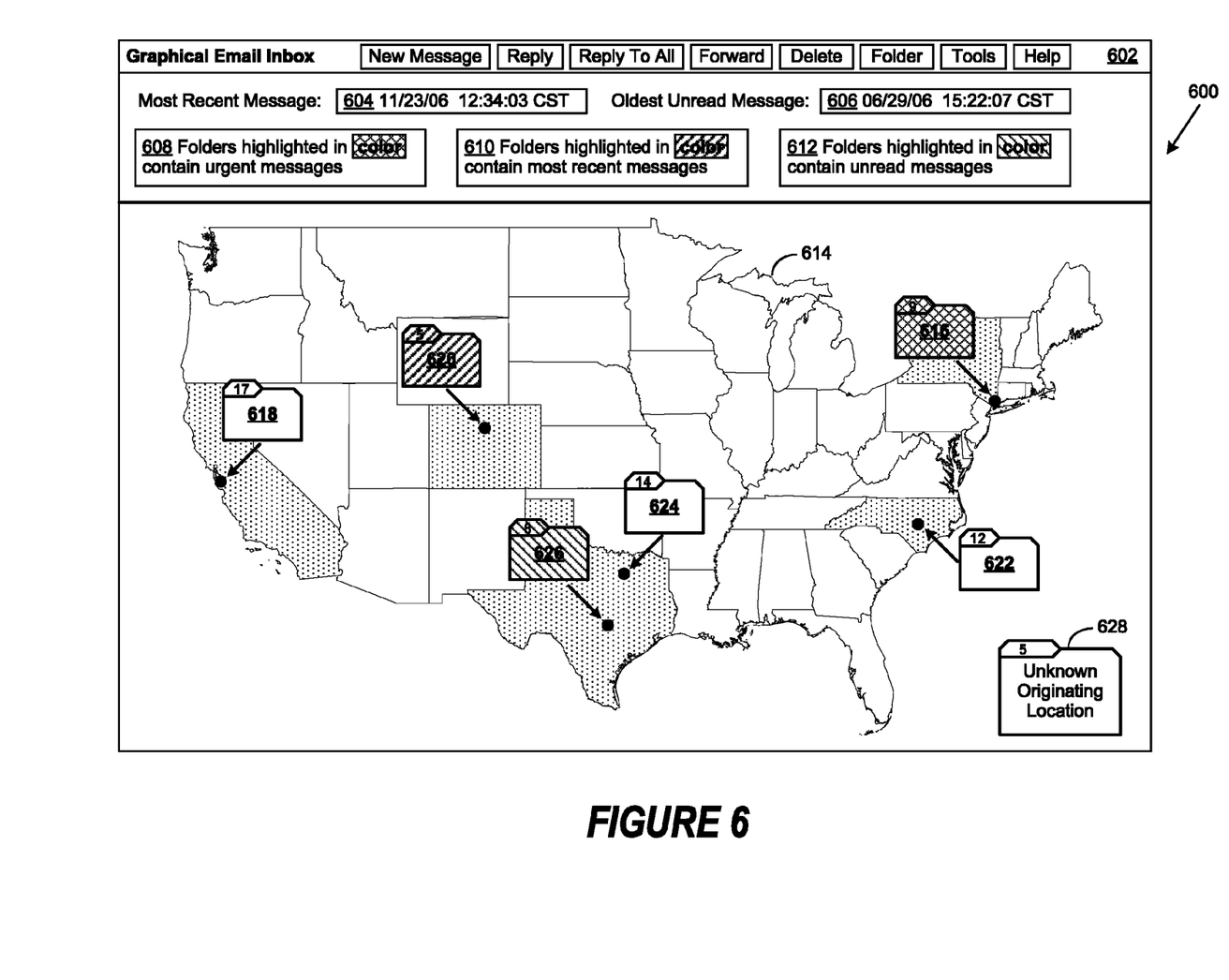
FIG. 6 shows the user interface of an email client as used for mapping received emails to predetermined graphical Inboxes represented as file folders comprising a geographical map.

FIG. 6 shows the user interface of an email client 600 as used for mapping received emails to predetermined graphical Inboxes represented file folders comprising a geographical map. The user interface of email client 600 comprises command bar 602, time and date stamp of the most recently received email message 604, and time and date stamp the oldest unread email message 606. The user interface of email client 600 further comprises alert messages and color legends for graphical Inboxes containing urgent messages 608, most recent messages 610, and unread messages 612. The user interface of email client 600 also comprises a graphical representation of a map of the United States 614, which comprises graphical Inboxes represented as file folders associated with individual states, and a graphical Inbox 628 comprising 5 email messages with unknown originating locations.

In one embodiment, the map of the United States 614 comprises graphical Inboxes for New York 616, California 618, Colorado 620, North Carolina 622 and Texas 624. In this embodiment, the file folder representing the graphical Inbox for Armonk, N.Y. 616 contains 9 messages and exhibits display attributes signifying that it contains urgent email messages as indicated in alert and color legend 608. The file folder representing the graphical Inbox for San Jose, Calif. 618 similarly contains 17 messages and also exhibits display attributes signifying that it contains urgent email messages as indicated in alert and color legend 608. The file folder representing the graphical Inbox for Boulder, Colo. 620 contains 5 messages, but exhibits display attributes signifying that it contains the most recently received email messages as indicated in alert and color legend 610. Similarly, two file folders respectively represent the graphical Inbox for Southlake Tex. 624 containing 14 messages, and the graphical Inbox for Austin, Tex. 626, containing 8 messages and exhibiting display attributes signifying that it contains the most unread email messages as indicated in alert and color legend 612. In a like manner, the file folder representing the graphical Inbox for Raleigh, N.C. 622 contains 12 messages, but only exhibits display attributes signifying that it contains email messages originating from North Carolina.

Figure 7:
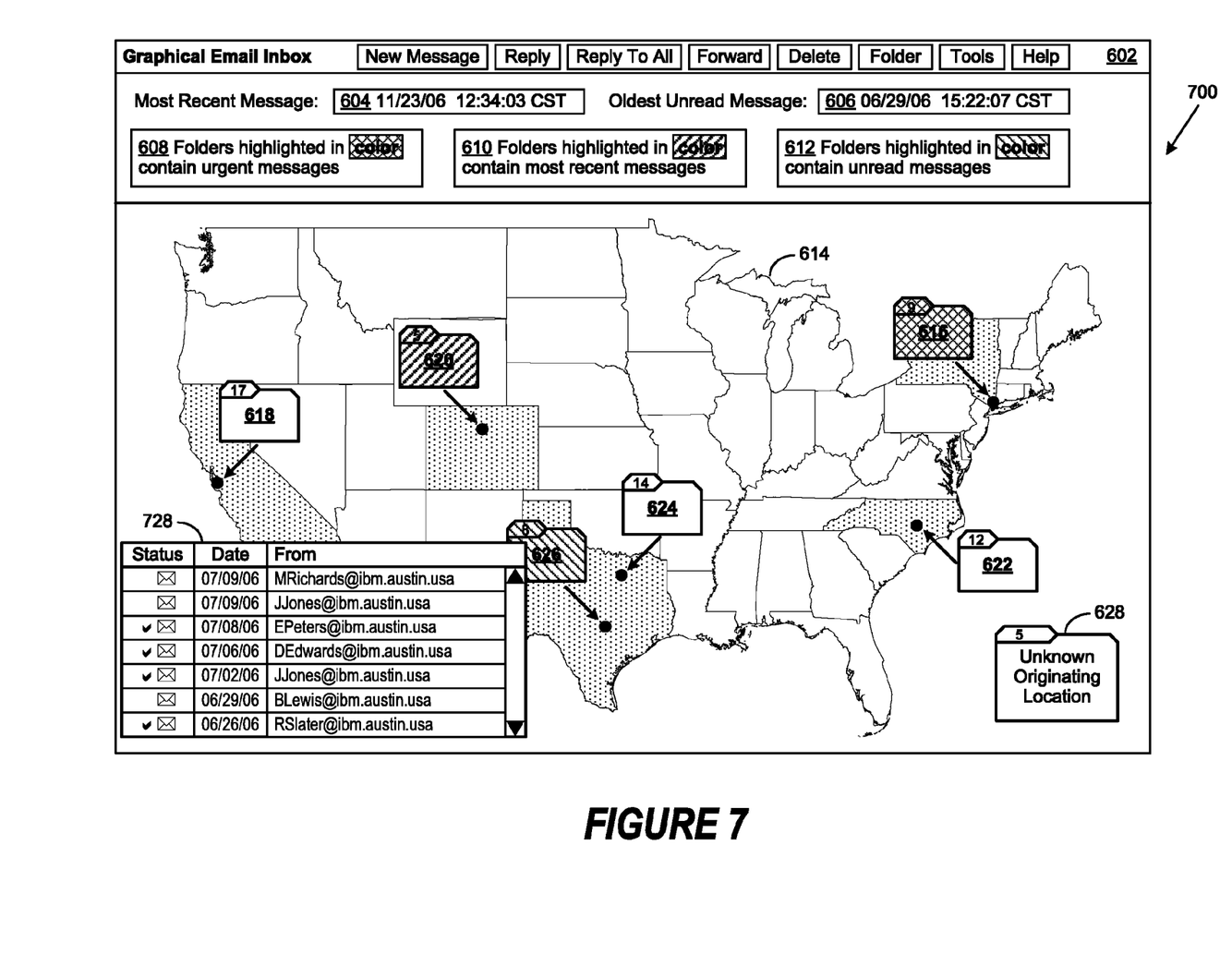
FIG. 7 shows the user interface of an email client as used for displaying status details of received emails mapped to predetermined graphical Inboxes.

FIG. 7 shows the user interface of an email client 700 as used for displaying status details of received emails mapped to predetermined graphical Inboxes represented as a geographical map. In one embodiment, email message detail window 728 is implemented with the email client user interface of FIG. 6 described in greater detail herein. In one embodiment, the recipient invokes the email message detail window 728 through user gesture such as a mouse double-click or hover over the graphical Inbox for Austin, Tex. 626. Once opened, the recipient scrolls through the email messages contained in the graphical Inbox to check read/unread status, received date, and sender.

Figure 8:
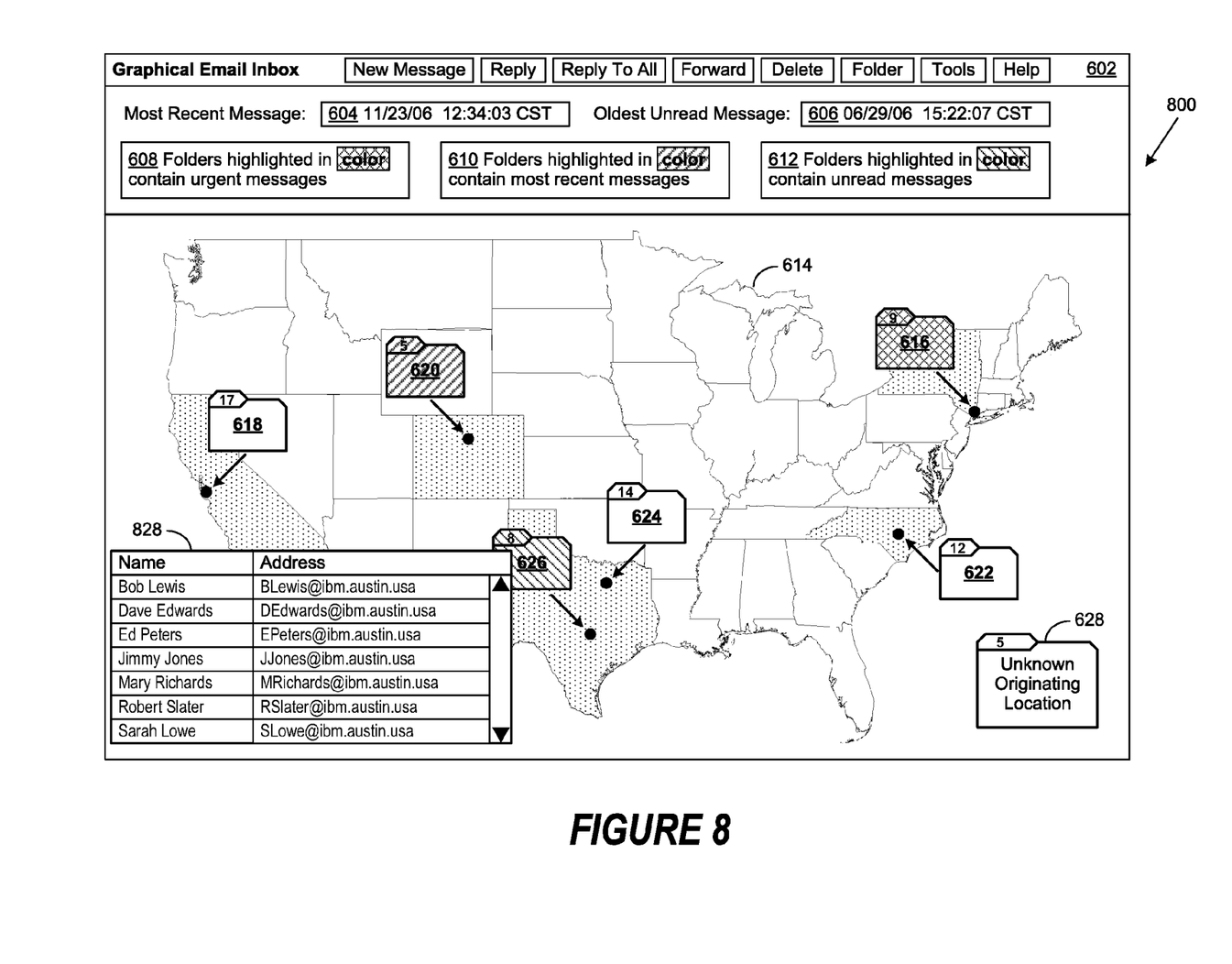
FIG. 8 shows the user interface of an email client as used for displaying location information details of email users mapped to predetermined graphical Inboxes.

FIG. 8 shows the user interface of an email client 800 as used for displaying associated location information details of email users mapped to predetermined graphical Inboxes represented as a geographical map. In one embodiment, email user location information detail window 828 is implemented with the email client user interface of FIG. 6 described in greater detail herein. In one embodiment, the recipient invokes the email user location information detail window 828 through user gesture such as a mouse double-click or hover over the graphical Inbox for Austin, Tex. 626. Once opened, the recipient scrolls through the addresses contained in the graphical Inbox to determine the email user's name. In another embodiment, an email sender invokes the email user location information detail window 828 through user gesture such as a mouse double-click or hover over the graphical Inbox for Austin, Tex. 626. Once opened, the sender scrolls through the names and addresses contained in the graphical Inbox to determine which email users are located in Austin, Tex.

Figure 9:
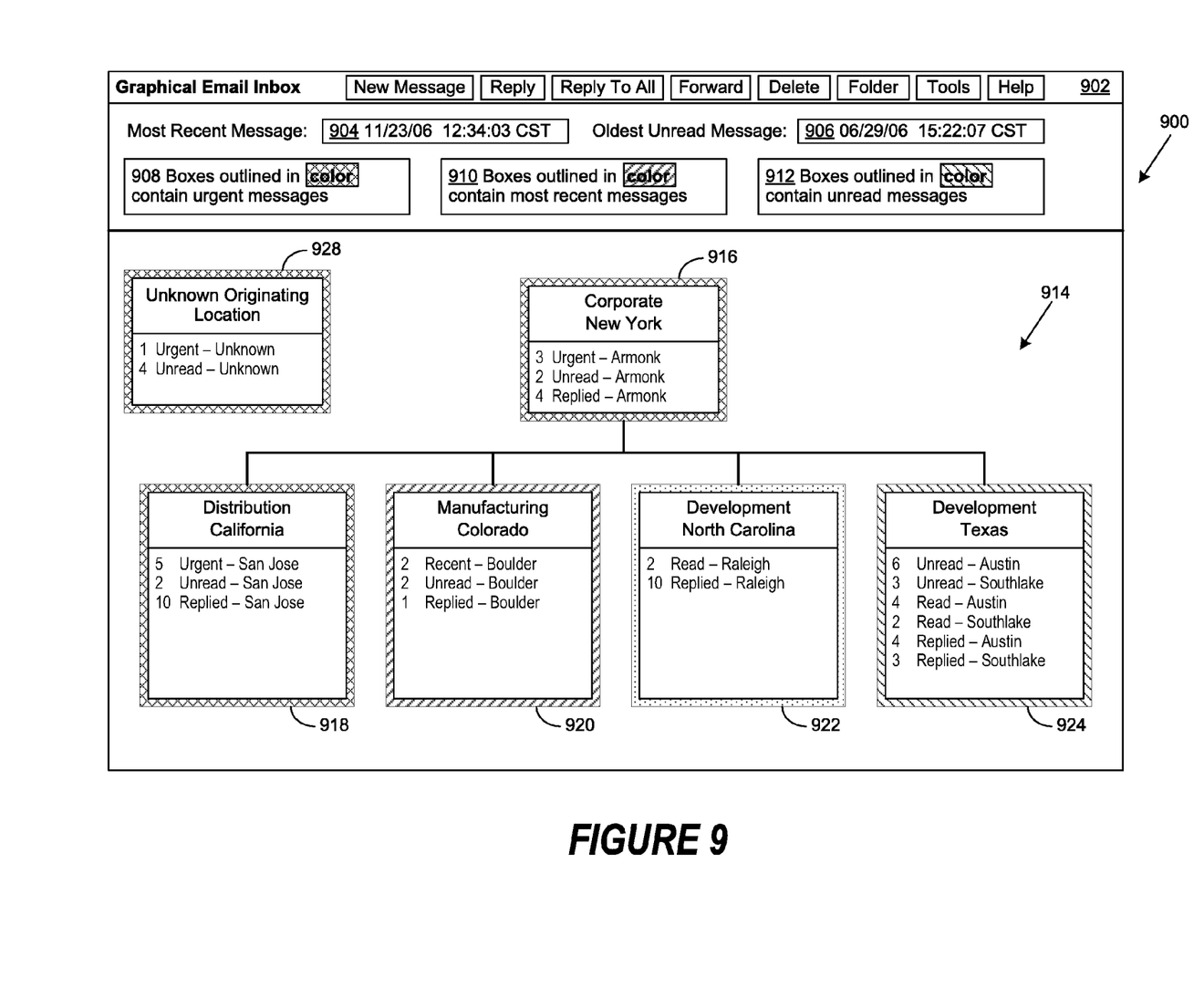
FIG. 9 shows the user interface of an email client as used for mapping received emails to predetermined graphical Inboxes depicting an organizational hierarchy chart.

FIG. 9 shows the user interface of an email client 900 as used for mapping received emails to predetermined graphical Inboxes depicting an organizational hierarchy chart. The user interface of email client 900 comprises command bar 902, time and date stamp of the most recently received email message 904, and time and date stamp the oldest unread email message 906. The user interface of email client 900 further comprises alert messages and color legends for graphical Inboxes containing urgent messages 908, most recent messages 910, and unread messages 912. The user interface of email client 900 also comprises a graphical representation of an organization hierarchy chart 914, comprising graphical Inboxes represented as functional units located in different states, and a graphical Inbox 628 comprising 5 email messages with unknown originating locations. In one embodiment, the organization hierarchy chart 914 comprises graphical Inboxes for corporate headquarters in Armonk, N.Y. 916, distribution in San Jose, Calif. 918, manufacturing in Boulder, Colo. 920, and development in Raleigh, N.C. 922 and two locations (Austin and Southlake) in Texas 924.

In this embodiment, the organization box representing the graphical Inbox for Armonk, N.Y. 916 contains 9 messages and exhibits display attributes signifying that it contains urgent email messages as indicated in alert and color legend 908. The graphical Inbox for Armonk, N.Y. 916 further displays email message details indicating that the graphical Inbox comprises 3 urgent, 2 unread, and 4 replied-to email messages. The organization box representing the graphical Inbox for San Jose, Calif. 918 similarly contains 17 messages and also exhibits display attributes signifying that it contains urgent email messages as indicated in alert and color legend 908. The graphical Inbox for San Jose Calif. 918 further displays email message details indicating that the graphical Inbox comprises 5 urgent, 2 unread, and 10 replied-to email messages. The organization box representing the graphical Inbox for Boulder, Colo. 920 contains 5 messages, but exhibits display attributes signifying that it contains the most recently received email messages as indicated in alert and color legend 910. The graphical Inbox for Boulder, Calif. 918 further displays email message details indicating that the graphical Inbox comprises 2 recent, 2 unread, and 1 replied-to email messages. Similarly, the organization box representing the graphical Inbox for Texas 924 containing 6 unread, 4 read, and 4 replied-to messages for Austin and 3 unread, 2 read, and 3 replied-to messages for Southlake. The organization box representing the graphical Inbox for Texas 924 further exhibits display attributes signifying that it contains the most unread email messages as indicated in alert and color legend 912. In a like manner, the organization box representing the graphical Inbox for Raleigh, N.C. 922 contains 2 read and 10 replied-to messages, but only exhibits display attributes signifying that it contains email messages originating from North Carolina.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer-implementable method for mapping a plurality of received electronic mail (email) messages to a plurality of predetermined graphical representations of an email Inbox, comprising:

associating, via a computer system, predetermined sender and originating information with an email that is to be received by a recipient;

using, via the computer system, the associated predetermined sender and originating information to depict an originating location of a received email message in a graphical display;

generating, via the computer system, status information comprising received email messages; and applying, via the computer system, display attributes to predetermined email Inbox graphical representations, the display attributes indicating the status information of received email messages mapped to the predetermined email Inbox graphical representations; and wherein the plurality of email Inbox graphical representations comprises a geographical map, the geographical map further comprising a plurality of geographical subsets, the geographical subsets being configurable to implement at least one email Inbox graphical representation.

2. The method of claim 1, wherein the sender and originating information comprises an information repository operable to generate predetermined sender and originating information for use by an email graphical Inbox mapper.

3. The method of claim 1, wherein the sender and originating information is appended to the received email message and is configured for use by an email graphical Inbox mapper.

4. The method of claim 1, wherein the sender and originating information comprises at least one of a physical address of a sender and an originating email server address of a sender.

5. The method of claim 1, wherein the plurality of email Inbox graphical representations comprises:

a hierarchical organization chart, the hierarchical organization chart further comprising a plurality of hierarchical subsets, the hierarchical subsets being configurable to implement at least one email Inbox graphical representation.

6. The method of claim 1, wherein the graphical display comprises at least one of an email client user interface operable to display status information of email messages mapped to a predetermined email Inbox graphical representation; and, an email client user interface operable to display associated sender and originating information of email messages mapped to a predetermined email Inbox graphical representation.

7. The method of claim 1, wherein the display attributes comprise a predetermined plurality of colors configurable to correspond to email message status information.

8. A system comprising:

a processor;

a data bus coupled to the processor; and a computer-usable medium embodying computer program code, the computer-usable medium being coupled to the data bus, the computer program code for mapping a plurality of received electronic mail (email) messages to a plurality of predetermined graphical representations of an email Inbox and comprising instructions executable by the processor and configured for:

associating predetermined sender and originating information with an email that is to be received by a recipient;

using the associated predetermined sender and originating information to depict an originating location of a received email message in a graphical display;

generating status information comprising received email messages; and applying display attributes to predetermined email Inbox graphical representations, the display attributes indicating the status information of received email messages mapped to the predetermined email Inbox graphical representations; and wherein the plurality of email Inbox graphical representations comprises a geographical map, the geographical map further comprising a plurality of geographical subsets, the geographical subsets being configurable to implement at least one email Inbox graphical representation.

9. The system of claim 8, wherein the sender and originating information comprises an information repository operable to generate predetermined sender and originating information for use by an email graphical Inbox mapper.

10. The system of claim 8, wherein the sender and originating information is appended to the received email message and is configured for use by an email graphical Inbox mapper.

11. The system of claim 8, wherein the sender and originating information comprises at least one of a physical address of a sender and an originating email server address of a sender.

12. The system of claim 8, wherein the plurality of email Inbox graphical representations comprises:

a hierarchical organization chart, the hierarchical organization chart further comprising a plurality of hierarchical subsets, the hierarchical subsets being configurable to implement at least one email Inbox graphical representation.

13. The system of claim 8, wherein the graphical display comprises at least one of an email client user interface operable to display status information of email messages mapped to a predetermined email Inbox graphical representation; and, an email client user interface operable to display associated sender and originating information of email messages mapped to a predetermined email Inbox graphical representation.

14. The system of claim 8, wherein the display attributes comprise a predetermined plurality of colors configurable to correspond to email message status information.

15. A tangible non-transitory computer-usable medium embodying computer program code, the computer program code comprising computer executable instructions configured for:

associating predetermined sender and originating information with an email that is to be received by a recipient;

using the associated predetermined sender and originating information to depict an originating location of a received email message in a graphical display;

generating status information comprising received email messages; and applying display attributes to predetermined email Inbox graphical representations, the display attributes indicating the status information of received email messages mapped to the predetermined email Inbox graphical representations; and wherein the plurality of email Inbox graphical representations comprises a geographical map, the geographical map further comprising a plurality of geographical subsets, the geographical subsets being configurable to implement at least one email Inbox graphical representation.

16. The non-transitory computer-usable medium of claim 15, wherein the sender and originating information comprises an information repository operable to generate predetermined sender and originating information for use by an email graphical Inbox mapper.

17. The non-transitory computer-usable medium of claim 15, wherein the sender and originating information is appended to the received email message and is configured for use by an email graphical Inbox mapper.

18. The non-transitory computer-usable medium of claim 15, wherein the sender and originating information comprises at least one of a physical address of a sender and an originating email server address of a sender.

19. The non-transitory computer-usable medium of claim 15, wherein the plurality of email Inbox graphical representations comprises:

a hierarchical organization chart, the hierarchical organization chart further comprising a plurality of hierarchical subsets, the hierarchical subsets being configurable to implement at least one email Inbox graphical representation.

20. The non-transitory computer-usable medium of claim 15, wherein the graphical display comprises at least one of:
   an email client user interface operable to display status information of email messages mapped to a predetermined email Inbox graphical representation; and,
   an email client user interface operable to display associated sender and originating information of email messages mapped to a predetermined email Inbox graphical representation.

21. The non-transitory computer-usable medium of claim 15, wherein the display attributes comprise a predetermined plurality of colors configurable to correspond to email message status information.

* * * * *